United States Patent [19]

Castel et al.

[11] Patent Number: 4,549,296
[45] Date of Patent: Oct. 22, 1985

[54] DEVICE FOR REPORTING ERROR CONDITIONS OCCURRING IN ADAPTERS, TO THE DATA PROCESSING EQUIPMENT CENTRAL CONTROL UNIT

[75] Inventors: Rene Castel, Vence; Gerard Dalboussiere, La Colle-sur-Loup; Michel Kulakowski, Carros, all of France

[73] Assignee: International Business Machines Corp., Armonk, N.Y.

[21] Appl. No.: 524,492

[22] Filed: Aug. 18, 1983

[30] Foreign Application Priority Data

Aug. 30, 1982 [EP] European Pat. Off. ........ 82430023.0

[51] Int. Cl.⁴ ............................................. G06F 11/00
[52] U.S. Cl. ......................................... 371/16; 371/14
[58] Field of Search ...................... 371/16, 19, 14, 39, 371/12; 364/200, 900

[56] References Cited

U.S. PATENT DOCUMENTS 3,873,819  3/1975  Greenwald ........................... 371/16
3,984,814  10/1976  Bailey, Jr. et al. .................... 371/12
4,423,508  12/1983  Shiozaki et al. ....................... 371/16
4,443,849  4/1984  Ohwada ................................ 364/200

Primary Examiner—Charles E. Atkinson
Attorney, Agent, or Firm—John B. Frisone

[57] ABSTRACT

In a data processing equipment handling communication lines connected to a central control unit through adapters and a CCU input/output bus, an error reporting device is provided in each adapter for reporting error conditions occurring in the adapter to the central control unit. The adapters are of the type including a microcode controlled microprocessor provided with input and output buses connected to the CCU input-/output bus through an interface. The error reporting device in association with dedicated circuits in the interface insures the transmission of the error conditions occurring in the adapter to the central control unit, even when such error conditions affect the integrity of the microcode. When the error reporting device detects an error affecting the microcode integrity, it generates a hard stop signal which causes the operation of the microprocessor under the control of the microcode to be stopped and the error conditions to be transferred to the central control unit making use of the same paths as those used for reporting errors which do not affect the microcode integrity.

8 Claims, 8 Drawing Figures

DEVICE FOR REPORTING ERROR CONDITIONS OCCURRING IN ADAPTERS, TO THE DATA PROCESSING EQUIPMENT CENTRAL CONTROL UNIT

TECHNICAL FIELD

In a data processing equipment such as a communications controller, the invention relates to a device for reporting errors occurring in microprocessor-controlled line adapters, to the central control unit.

BACKGROUND OF THE INVENTION

The communications controllers are data processing equipment designed to be incorporated into data tele-processing network so as to handle transmissions over various lines which are connected thereto. Generally, the main control of the data tele-processing network is concentrated into one or several central processing units having a list of the data processing rules for processing the data coming from/or to be sent to terminal stations, or terminals, of the data tele-processing network. Both transmission and reception of the data through the communications lines, are processed by communications controllers controlled by the central processing unit(s) (CPU's). Besides the processing functions, the controller is in charge of carrying out directory functions, more specifically, functions directly relevant to the standard transmission procedures. Consequently, the central processing units (CPU's) are released from the corresponding tasks and can devote itself to carrying out other operations.

The communications controller is a complex assembly the intelligence of which is most concentrated in one or several central control units CCU's. The central control units are connected to the terminals through line adapters and to the central processing units CPU's through channel adapters which are so designated since they are connected to the channels of the central processing unit(s).

The line adapters can serve a number of communications lines by means of a cyclical scanning device comprised of an assembly of random access memories wherein the data are buffered, which are received from the various lines or which must be transmitted thereto, under the control of the scanning device. The line adapters have, each, a microprocessor which releases the central control units from a number of tasks, such as handling the data exchanged between the central control unit CCU and the lines, on both transmission and reception sides.

In such an environment, it is necessary for the error conditions detected in a line adapter, to be reported to the central control unit. Various approachs can be contemplated to perform this function. For instance, only the microcode of the microprocessor could be used. Such an approach has for a drawback that, when the error condition has entailed a failure in the microprocessor, the microcode integrity may not be insured and, as a consequence, the error conditions are not reported to the central control unit by the microcode.

Another approach would consist in providing each line adapter with two microprocessors. It is obvious that such an approach is expensive for both hardware and software points of view because it requires means for handling the exchanges between the two microprocessors.

A third approach would consist in dedicating a special path for error reporting. Such an approach is also expensive because it requires additional hardware and additional programming development to support this new path.

An object of this invention is to provide each adapter with a device for reporting the error conditions occurring in the line adapters, to the central processing unit without assistance from microcode-controlled microprocessors handling the data exchanged between the lines connected to the adapters and the central control unit, when the microcode integrity is affected by error conditions.

SUMMARY OF THE INVENTION

According to this invention, in a data processing equipment such as a communications controller handling lines through adapters comprised of a microprocessor having error detecting circuit and an internal error register and operating under the control of a microcode, each adapter is provided with a device for reporting the error conditions occurring in the adapter, to the central processing unit. Such a device includes means for storing the error conditions detected by the error detecting circuits. Classification means receive the error conditions and give two indications: The first one is indicative that at least one error condition affecting the microcode integrity has occurred, and the second one is indicative that at least one error condition not affecting the microcode integrity, has occurred. Hard stop signal generating means are responsive to the first indication for stopping the operation of the microprocessor under the control of its microcode. When the hard stop signal is active, first transfer means cause the error conditions to be reported to the central control unit, and second transfer means cause the contents of the microcoprocessor internal error register to be reported to the central control unit.

BRIEF DESCRIPTION OF THE DRAWINGS

While the specification includes claims particularly pointing out and distinctly claiming that which is regarded as the present invention, further details of a preferred embodiment of the invention may be more readily ascertained from the following technical description when read in conjunction with the accompagnying drawings wherein:

TECHNICAL DESCRIPTION

Figure 1:
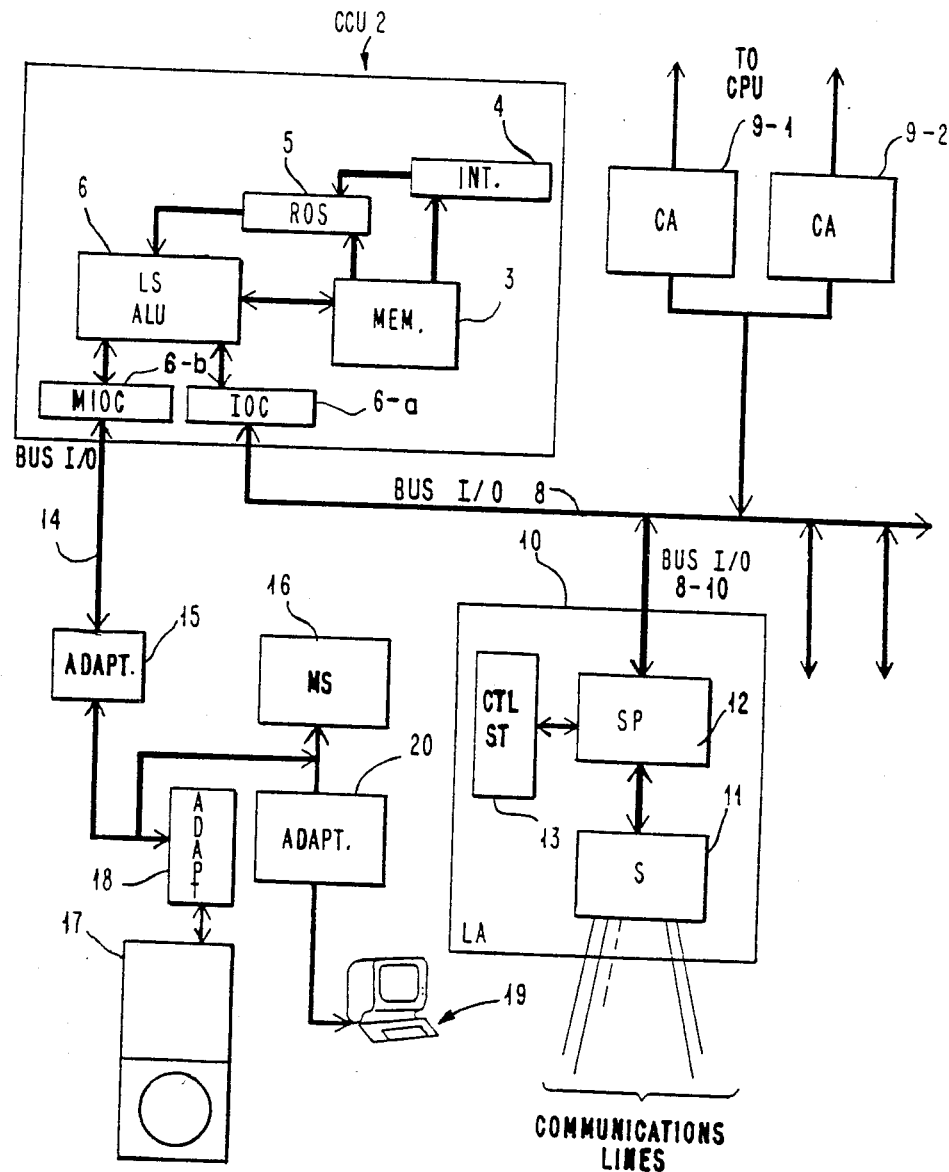
FIG. 1 is a schematic diagram of a communications controller wherein the error condition reporting device according to this invention, can be used.

FIG. 1, shows a communication controller wherein the invention can be used. The communications controller controls the exchange of data between terminals connected to the communications lines and a central processing unit CPU which may be of the IBM 370 type.

When data are exchanged from terminals to the central processing unit CPU, the function of the controller is to scan the communications lines, multiplex the data coming on these lines, and transmit the so-obtained data burst to the central processing unit, via a high speed channel.

When the data are exchanged from the central processing unit CPU to terminals, the controller receives the multiplexed data to be transmitted from the central processing unit through the high speed channel, demultiplex the data and route them to the addressed receiving terminals.

As shown in FIG. 1, the controller includes a central control unit CCU 2 which is of the same type as the one used in the IBM 3705 type communications controller. Such a unit is a processor which operates under the control of a network control program having several interrupt levels. The program is stored in memory MEM 3. Each event that occurs entails an interruption at a given program level by means of an interrupt mechanism INT 4, which causes the event processing code to be run. The read-only store ROS 5 contains the control words necessary to control the various operations to be carried out after decoding the program instructions. Decoding the operation code of the various instructions causes one or several control words in store 5 to be addressed, which control the operation of the various components of unit 2. The operations to be carried out are processed by assembly 6 comprised of an arithmetic and logic unit ALU and a local store LS. General registers are defined at given address positions in the local store, these registers are used by the control program for executing the instructions and processing the data. These registers are partitioned into groups, each group being assigned to a program level. This causes a program at one level to be interrupted at another level without having to save the register contents.

In addition, external registers are provided in the local store, for storing information necessary for the communication between the control program and the arithmetic and logic unit circuits, or any other circuits in control unit 2. By means of an input instruction, the program may cause the contents of an external register to be loaded into a general register and, by means of an output instruction, the contents of a general register may be loaded into an external register.

The control unit 2 communicates with the different portions of the controller, through interfaces IOC and MIOC 6a and 7b, respectively.

An input/output bus I/O 8 is connected to interface IOC 6a. The central processing unit CPU is connected to this bus, through one or several channel adapters CA, two of which, 9-1 and 9-2, are schematically shown in FIG. 1.

Line adapters are connected to input/output bus I/O 8. One of these devices 10 is schematically shown in the Figure, it is connected to bus I/O 8 through bus I/O 8-10. Each line adapter ensures the scanning of part of the communications lines to be handled by the controller. Consequently, the number of the adapters varies according to the network configuration.

Each line adapter includes a scanning device, S 11 being comprised of memories which, under the control of an addressing device, store the data received from the lines or to be transmitted to the lines. A memory position area corresponds to each line. It also includes a microprogrammed microprocessor SP 12 and an associated control store 13. Such a microprocessor releases the central control unit from a number of functions, functions which, more specifically, are related to the processing of the data on the lines connected to the associated line adapter.

The other interface MIOC 6-Bis connected to an input/output bus I/O 14. A maintenance and service system MS 16 is connected to this bus, through an adapter 15, which is also a microprogrammed microprocessor. It is connected to a disk unit 17, through an adapter 18, and to a console 19 comprised of a display unit and a keyboard, through an adapter 20. The console is a terminal which may be of the IBM 3101 type.

Such a maintenance and service system fulfills three functions. It enables the operator to supervise the controller by controlling and analyzing the effected actions, and makes the repairs easier since the programming errors and the failures in the controller and in the maintenance system, proper can be isolated and repaired. In addition, it is utilized to execute services, more specifically, loading programs from the disks unit, reading and writing registers, etc. To this end, the network control program in unit CCU 2 includes error recovery procedures which prevent the controller from being affected by the hardware errors or intermittent transmission errors. These procedures are carried out automatically upon occurrence of an error condition. The maintenance system gathers the registered errors that have occurred in the controller and report them to the central system in the form of alert messages.

In addition, diagnostic routines can be used for the finding out of failures. The routines are in the file of the disk unit and, therefore, can be read and run even when the central system, the hannel or the controller, happens to be failing.

The control unit communicates with the channel or line adapters by using two types of operation. The first type operations PIO are program-initiated operations, started by either one of the special instructions IOH or IOH I which are two instructions that have been added to the instruction set of the IBM 3705 type controller. These instructions will be described further on. The second type operations AIO are adapter-initiated operations and correspond to a cycle steal data transfer.

The first of the instructions IOH is an adapter input/output instruction, of the RR (register-to-register) type having the following configuration:

| 0 | R2 | 0 | R1 | X"50" |
|---|----|----|----|-------|
| 0 | 1  | 3  | 5  | 7   15 |

Such an instruction causes the CCU register contents determined by field R1 to be transferred to a channel or line adapter determined by the contents of field R2, or vice-versa.

The second instruction IOH I is a value IOH input/output instruction of the RA type immediate, having the following format:

| 0000 | R1 | X"70" | |
|---|---|---|---|
| 0 | 4 5 | 7 8 | 15 16 31 |

Such an instruction transfers the register contents determined by R1 to an adapter, or vice-versa. The external adapter register is determined by the contents of the second instruction half-word (immediate address).

In such an environment, when an error condition occurs in a line adapter, and when this error condition does not cause any failure in the microprocessor, the error condition can be reported to the central control unit via the normal microprocessor paths and the bus and interface connections between the line adapter and the control unit.

When an error condition causes a failure in the microprocessor, thereby affecting the microcode integrity, the condition cannot be reported via the normal paths, any longer.

According to this invention, a device is added into each line adapter so that these types of error conditions can be reported.

Figure 2:
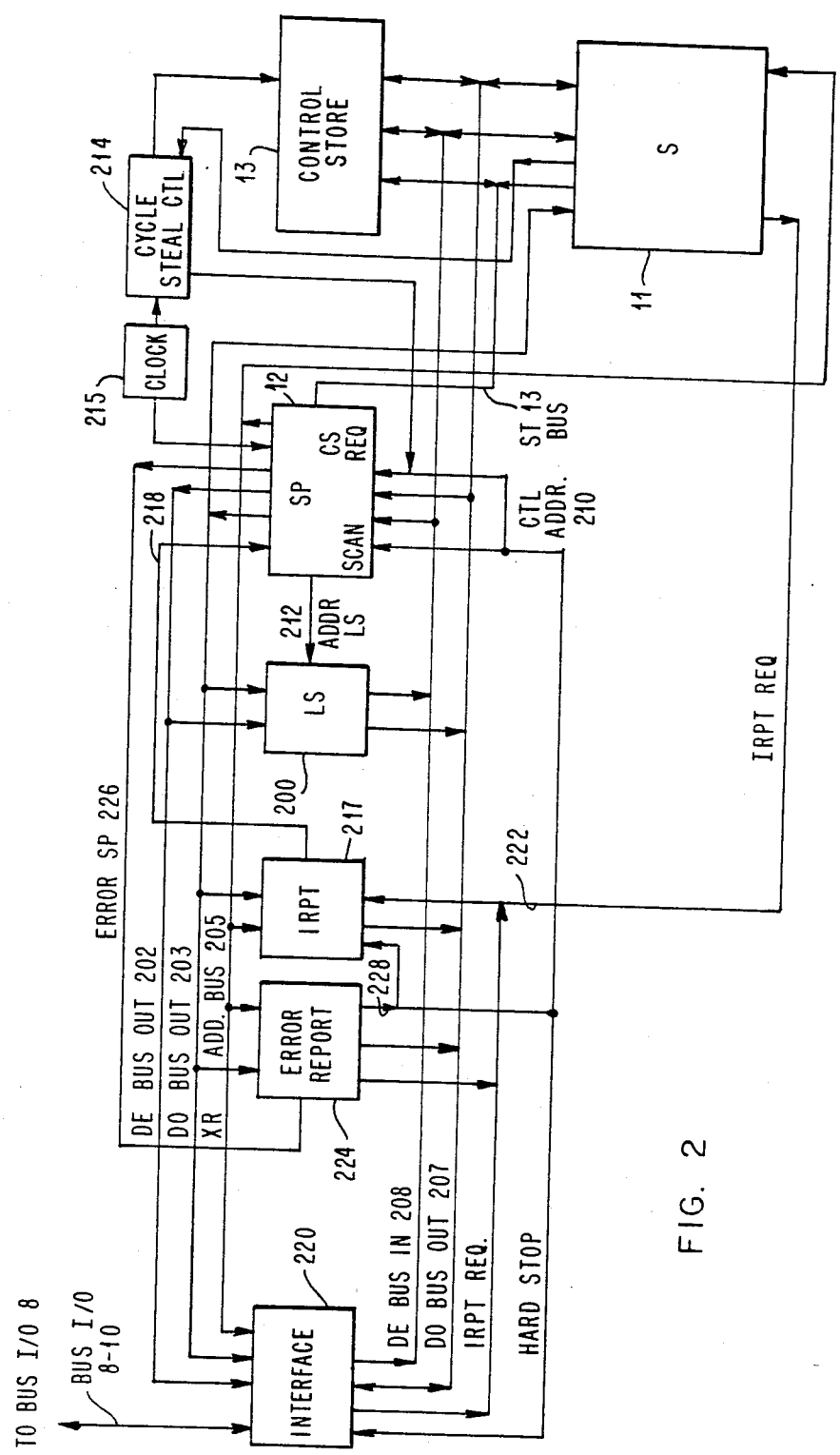
FIG. 2 is a schematic diagram of an adapter incorporating the error condition reporting device.

FIG. 2 illustrates, in a schematic form, a line adapter LA, 10 of FIG. 1. It includes a microprocessor SP 12 which, in a preferred embodiment, is of the same type as the one used in the IBM 3880 type control unit. A block diagram thereof is given in the article "A High Performance Microprocessor" by J. I. Norris, published in review IBM Disk Storage Technology, February 1980.

Such a line adapter operates under the control of a microprogram stored in control store 13. Two register areas are directly addressable by the microinstructions, namely, local store registers 200 which are 64 in number, and external registers XR through which the microprocessor can communicate with the external elements.

Data buses 202 and 203 are the output paths to local store 200 and the external registers. The Data Even Bus Out, DE BUS OUT, 20,2 are the data path to the even address local store registers, and the Data Odd Bus Out, DO BUS OUT, 203 are the data path to the odd address local store registers and to the external registers in the elements external to the microprocessor.

The external registers are addressed by bus 205 which can also be used to address registers of scanning device S, 11, considered as external registers.

Input buses 207 and 208 are the input paths to the microprocessor from the local store, the external registers and the input/output buses of the control store. The Data Odd Bus In (DO BUS IN) 207 is the data path for the odd address local store registers, for the bits 8 through 15 of the control store data and instructions, and for the external registers; Data Even Bus In (DE BUS IN) 208 is the data path for the even address local store registers, and for the bits 0 through 7 of the control store data and instructions. The control store is addressed by the microprocessor, via bus 210, and the local store, is addressed via bus 212.

Since scanning device S and the control store, as well as the control store and the central control unit CCU, can exchange data in the cycle steal mode, a control logic circuit 214 under control of clock 215 has for functions to control store 13 and handle the cycle steal exchange protocol by making use of the facility offered by the microprocessor cycle steal request line, CS REQ of the microprocessor.

The interrupt mechanism IRPT 217 has for functions to determine the priorities and to mask the microprocessor software or hardware-controlled interruptions. The interrupt requests IRPT come from scanning device S, the central control unit through interface circuit 220, and are applied to interrupt circuit 217, via bus 222.

The interface circuit 220 ensures communication between the line adapter and bus I/O 8 through which the adapter is connected to control unit CCU.

Circuit 224 according to this invention includes means for detecting the various error conditions which may occur in the adapter. It receives the error line ERROR SP 226 which reports whether an error has occurred in the microprocessor, and the bits on buses 203 and 205. It supplies an indication on its output line HARD STOP 228 which is connected to interface 220, to microprocessor SP 12, and to interrupt mechanism 217. The errors are classified into two categories, namely, error conditions handled by the microcode and error conditions causing a hard stop condition.

In normal operation, interface 220 associated with the microcode routines ensures communication between the adapter and unit CCU so as to exchange information and to report the microcode-handled error conditions. When an error condition occurs, which affects the microprocessor integrity, and which is the so-called hard stop error, logic 224 and interface 220 can report it to the control unit with no assistance from the microprocessor.

The adapter contains checkers which can detect various error conditions. These conditions are stored into an external address register having adress XR 03. This register can be accessed by the microprocessor in read/write mode. The bits of this register are set to "1" when an error is detected, with the following structure:
 bit 0: unexpected adapter acknoweldge
 bit 1: control store data write check
 bit 2: microprocessor check
 bit 3: external register address check
 bit 4: control store address check
 bit 5: local store address check
 bit 6: adapter interface check
 bit 7: bus I/O check Bits "0" through "5" correspond to the detection of error conditions which affect the microprocessor integrity and cause a hard stop condition, and bits 6 and 7 correspond to conditions which can be processed by the microcode.

Bit "0" is set to "1" if, when the microcode accesses in read or write operation, an external register implemented outside the range of external register addresses reserved for the scanning device connected to the microprocessor, an acknowledge signal is received by the microprocessor, which comes from the scanning device. The assigned address range is from OD to 17 in the hexadecimal code.

Bit "1" is set to "1" when a parity check is detected on buses 207 and 208 during a control store write operation.

Bit "2" is set to "1" whenever the error out ERROR SP line 226 becomes active. The checkers corresponding to this error condition are contained in the microprocessor, itself. When the microprocessor detects one of the following errors, namely, control store data error, local store external register data error, internal error, it stores internally the corresponding conditions in a register, and activates error line 226. These conditions can be extracted from the microprocessor by activating the SCAN line. In this case, the microprocessor places the aboce error condition on bits 0, 1, 2 of the DE BUS OUT 202.

Bit 3 is set to "1" when a parity check is detected on XR ADDR BUS 205 which comprises address bits line and external register select signal during a read or write operation.

Bit 4 is set to "1" when a parity check is detected on the Control Store Address bus 210 in control store read/write operation.

Bit "5" is set to "1" when a parity check is detected on the Local Store Address bus 212 and on the Local Store Even and/or Odd lines.

Bit "6" is set to "1" when, during an external register Read or Write operation in the scanning device external register address range, the acknowledge signal is not received from the scanning device.

Bit "7" is set to "1" when, during an I/O operation, a parity check is detected on the data bus I/O 8 during a data transfer or when an invalid pattern of control tags is detected on bus I/O 8.

In the case of microcode-handled error conditions (reported by bits 6 and 7), the microcode integrity is not affected and, through an error recovery procedure, the microcode reports such error conditions to the central control unit. These procedures will be disclosed further on.

The other error conditions, reported by bits 0 through 5, which affect the integrity of the microcode, are reported to the central cntrol unit without the processor assistance, according to this invention, via circuit 224 which will be described with reference to FIG. 4.

Before describing such a circuit, the exchange protocols between the adapter and the central control unit, will be disclosed.

Bus I/O 8 is comprised of the following lines:

| BUS I/O LINES | | TO |
|---|---|---|
| | | CCU  ADAPTER |
| Input/output | IO | → |
| Tag address | TA | → |
| Tag data | TD | → |
| Out/Read/Write | R/W | → |
| Halt | HALT | → |
| Reset | RES | → |
| Cycle Steal Granted | CSG | → |
| Cycle Steal Request | CSR | ← |
| Valid Byte | VB | ← |
| Valid Half-word | VH | ← |
| Parity valid | PV | ← |
| Interruption request removed | IRRR | ← |
| End of chain | EOC | ← |
| Modifier | M | < |
| Data byte 0 (8 bits + parity) | B0 | ←→ |
| Data byte 1 (8 bits + parity) | B1 | ←→ |

The bus can support both types of program-initiated input/output operation, namely, a PIO write operation and a PIO read operation.

The PIO write operation consists in transmitting information from the central control unit CCU to the adapter. The PIO read operation consists in transmitting information from the adapter to the central control unit CCU.

For a PIO write operation, the control unit activates tag IO. The adapters on the bus remove the interruptions placed on the bus (tag IRR). The control unit places the adapter address and the command to be executed, onto the bus I/O 8 data lines, and then activates tag TA. The format is as follows:

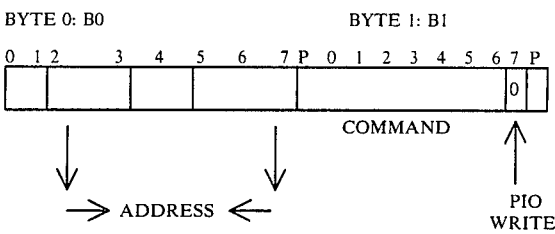

The adapter which recognizes its address and the type of command bit 7 of B1, is selected and sends tag VH as acknoledgment.

The control unit de-activates tag TA.

The adapter de-activates VH.

The control unit places the information to be transferred onto the bus data lines, and activates TD.

The selected adapter handles the information and activates tag VH.

The control unit de-actives tag IO. The operation is terminated, the adapters can place anew their interruption requests, on to the bus.

For a PIO write operation, the tag sequence is identical with that previously disclosed.

The control unit actives tag IO.

The adapters remove the interruptions.

The control unit places the address and the command on to the bus I/O 8 data lines and actives TA.

The adapter recognizes its address and detects that a PIO read operation, bit 7 of byte B1, set to "1", is concerned, and sends VH as acknowledgment.

The control unit de-activates TA.

The adapter de-activates VH.

The control unit activates TD.

The adapter places the information to be transferred on to the data line bus I/O 8, and activates signal VH, specifying that its data are valid, to the control unit.

The control unit de-activates TD.

The adapter de-activates VH.

The control unit de-activates tag IO.

The adapters can place anew the interrupt requests, on to the bus.

The adapter can interrupt the control unit.

It will place the bit corresponding to an interruption, ion to data lines of bus I/O 8; an external register having address: XR 05 is reserved for the storing of the interrupt requests; bit 0 of XR 05 interrupt of level 1, bit "1", interrupt of level 2.

The control unit will initiate a PIO read operation in order to obtain additional information relating to the interruption from the adapter. The information will be transmitted upon activation of tag TD by the control unit.

The interrupt requests will be taken into care by the control unit when tag IO is inactive.

The adapters will have to remove this information when tag IO becomes active.

Figure 3:
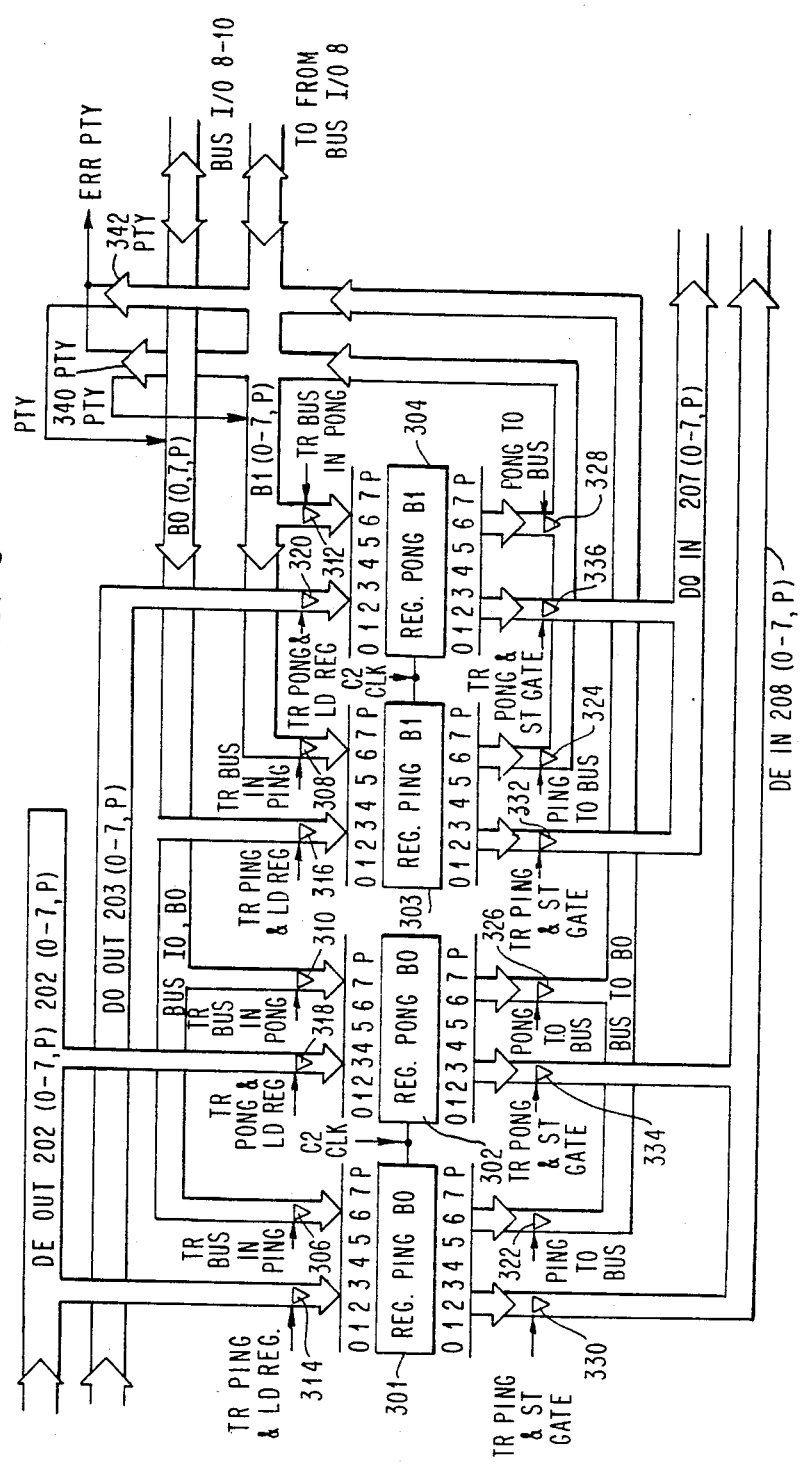
FIG. 3, shows the interface circuits 220 for data transfer between the central control unit and the adapters.

Interface transfer circuits 220 are shown in FIG. 3.

In the interface, two registers are used to transfer two half-word data from the microprocessor to bus I/O 8, or conversely, from bus I/O 8 to the microprocessor SP 12 by means of bus I/O 8-10 connecting the adapter 10 to bus I/O.

These PING and PONG registers are considered by the microprocessor as two registers in one page of local store LS 200.

They operate in flip-flop. Registers PING and PONG 301 and 302, respectively, reserved for byte 0, are connected to the microprocessor lines B0 of bus I/O 8-10 and to the microprocessor DE BUS OUT 202 and DE BUS IN 208. Registers PING and PONG 303 and 304 are connected to bus I/O 8-10, byte B1, and to the miroprocessor DO BUS OUT 203 and DO BUS IN 207.

Gates illustrated by triangles are inserted into the input and output buses of registers 301 through 304 in order to transfer, under given conditions, the contents of the buses to the registers in case of input gates, and the contents of the registers to the buses in case of output gates.

Gates 306 and 308 are opened by a command TR BUS IN PING for transfer from bus I/O 8-10 into registers PING 301 and PONG 303, respectively.

Gates 310 and 312 are opened by a command TR BUS IN PONG for transfer from bus I/O 8-10 into registers PONG 302 and 304, respectively.

Gates 314, 316 are opened by a command TR PING for transfer into registers PING 301 and 303 and a command LD REG for load into register. Gates 318 and 320 are opened by a command TR PONG for transfer into registers PONG 302 and 304 and a commande LD REG for load into register. The commands TR PING and TR PONG are activated by the microprocessor SP 12 logic as soon as the microprocessor has access to the corresponding pages of local store 200. Commands LD REG are used for a write operation into the registers.

Output gates 322 and 324 are opened by a command PING to BUS for the transfer of the contents of registers PING 301 and 303 on to bus I/O 8-10. Likewise, gates 326 and 328 are opened by a command PONG to BUS for the transfer of the contents of the registers to bus I/O 8-10.

Output gates 330 and 332 are opened by the commands TR PING and ST GATE for transfer from registers PING, and setting the gate, so as to transfer the contents of registers 301 and 303 to the DE BUS IN 208 and to the DO BUS IN 207, respectively.

Output gates 334 and 336 are opened by the commands TR PONG and ST GATE for transfer from registers PONG and setting the gate so as to transfer the contents of registers 302 and 304 to the DE BUS IN 208 and to the DO BUS IN 207, respectively.

Commands TR PING and TR PONG are activated by the microprocessor as soon as the corresponding pages of local store 20 are accessed. Commands LD REG and ST GATE enable the microprocessor to write in or read from the registers PING and PONG. The microprocessor logic control will active TR BUS IN PING or TR BUS IN PONG for writing the contents of bus I/O 8-10 into registers PING and PONG, and will activate PING to BUS or PONG to BUS for reading registers PING and PONG so as to transfer the contents thereof on to bus I/O 8-10 according to the information exchange protocol. In write operation, the microprocessor operates only for the reading of the contents of registers PING and PONG, and in read operation, it operates only for reading the contents of register PING and loading register PONG with the data corresponding to the pendant operation.

Two parity check circuits 340 and 342 are used to check the parity of data bits of byte B0 and B1 on bus I/O 8-10. They report the parity error ERR PTY and generate the parity bits PTY of bytes B0 and B1 on to bus I/O, in the case when said bytes have no parity bit, more specifically, when the contents of an external register is placed on to the bus.

The interface has, in addition, logic circuits, not shown, for generating the various control tags according to the communication protocol between the central control unit CCU and the adapters.

Figure 4:
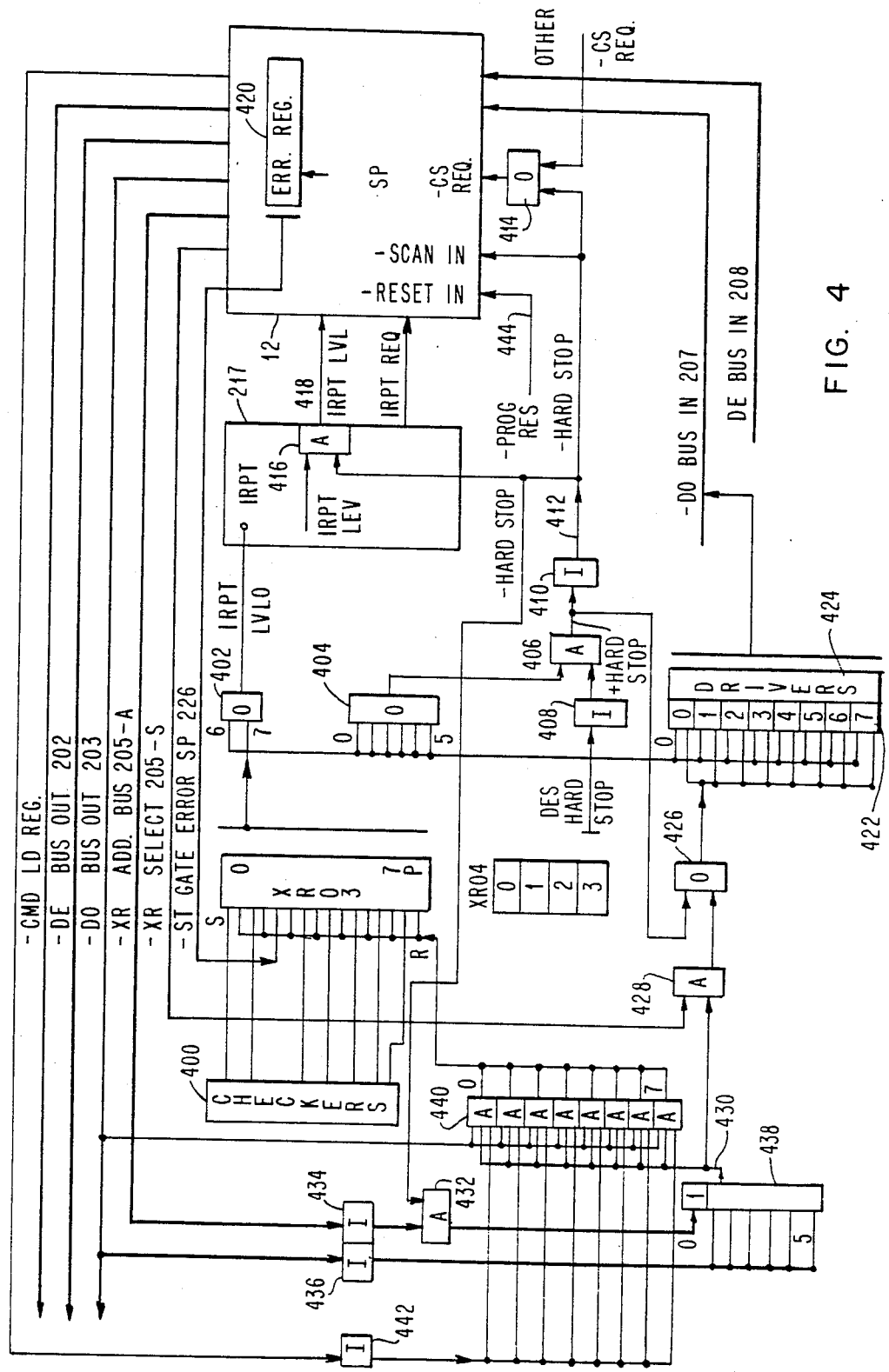
FIG. 4, shows the error condition reporting circuit 224.

The error reporting device according to this invention is shown in FIG. 4. Signals + and − indicate at which levels, high (+) or low (−) the signals on the lines, are active.

The errors are stored in the external address register XR 03 arranged in this circuit. The bits of this register are set to "1" by the various chechers schematically shown by block 400 in the line adapter.

The outputs indicative of errors are applied to the set inputs S of XR 03 register. Bit "2" is set to "1", through line ERROR SP 226, when an internal error condition occurs in the microprocessor, i.e., when one of the bits of the internal error register 420, is "1".

Classification means are provided so as to classify the error conditions into two categories. Such means include two OR circuits 402 and 404 which receive the contents of XR 03 register. OR circuit 402 receives bits 6 and 7 of XR 03 register and supplies at its output a signal indicative of an error which can be handled by the microcode, a signal which is used as a level 0 (the highest priority) interrupt request applied to circuit 217. OR circuit 404 receives only bits 0 through 5 of XR 03 register and supplies a high level signal indicative of an error which cannot be handled by the microcode. This signal is applied to AND circuit 406.

I. PROCESSING OF ERROR WHICH CANNOT BE HANDLED BY THE MICROCODE: HARD STOP ERRORS

An external register XR 04 which can be loaded by the microprocessor, contains status and control bits. Position 3 or XR 04 register is a control latch used to desable the "HARD STOP ERROR CONDITION" signal which supplies a command "Disable Hard Stop": DIS HARD STOP. Such a command is applied to inverter 408. When there is not such a command, AND circuit 406 supplies +HARD STOP signal when one of bits 0 through 5 is "1". +HARD STOP signal is inverted by inverter 410 so as to obtain −HARD STOP signal, on output line 412.

When line 412 is activated, the microprocessor is set in the "Cycle Steal Request" CS REQ mode, line 412 being applied to input −CS REQ of the microprocessor, through OR gate 414 which receives the normal cycle steal requests on its other input, which come from scanning device S. The microcode remains in such a mode until the hard stop error condition disappears.

In such a mode, the processing under control of the microcode stops but the clock goes on operating.

The −HARD STOP signal in 412 is also applied to the Scan In input of microprocessor 12, and to the input of AND circuit 416 in the interrupt processing logic 217. AND circuit 416 receives also the interrupt level IRPT LEV coded with three bits since the microprocessor has 8 interrupt levels.

When −HARD STOP signal is active (low level) on line 412, AND circuit 416 is closed and the input lines 418 indicating the interrupt level selected by logic 217 to the microprocessor, are not active.

It results from the two input conditions: SCAN IN line activated by line 412 and IRPT LEV line 418 inactive that the contents of internal microprocessor error register 420 is placed on to DO BUS OUT 203, with the following configuration:

Bit 0: Control Store data error 13
Bit 1: Local store/external register data error
Bit 2: Internal error The contents of XR 03 register is placed onto DO BUS IN 207 by the logic assembly comprised of AND circuits 422-0 through 422-7 and drivers 424.

Each of the AND circuits of 422 receives one of the bits of XR 03 register and a gating signal generated by OR circuit 426 and AND circuit 428.

OR circuit 426 receives +HARD STOP signal and the output of AND circuit 428. AND circuit 428 receives the command ST GATE and the address decode output 430 of the external register.

When an error condition occurs, any external register address can be placed onto the address bus 205. In the cycle steal mode which is activated by −HARD STOP signal, the external register addressing bus and line −ST GATE line keep the status they had before the error occurs. In order to prevent the contents of any register besides XR 03 register, from being placed on to the bus when a hard stop condition occurs, line SELECT.XR 205-S which belongs to XR ADDR BUS 205, the other lines BUS.ADD XR 205-A being reserved for the address bits, proper, is de-activated through AND gate 432. One input of AND circuit 432 receives HARD STOP signal, thereby closing such a circuit when the hard stop condition occurs, and the other input thereof receives signal −SELECT XR 205-S inverted by inverter 434.

The output of AND circuit 432 is sent to address decoder 438 which, in addition, receives the Bus 205 address bits inverted by inverter 436.

When AND circuit 432 is close, the select bit is 0 and the decode circuit supplies a low level output signal. XR 03 register is reset when the controller is powered on, or at any other time under the control of the control unit or by a reset signal supplied by AND circuit assembly 440.

Each of the AND circuits 440: 440-0, 440-7, receives one of the lines of the −DO BUS OUT 203, output line 430 of the address decode circuit, and the register load command −CMD LD REG line, through inverter 442.

Therefore, when there is no general reset command, XR 03 register latches are reset when one of the bits on bus 203 is inactive and when the XR 03 address decode line is active and the −CMD LD REG line is active (low level).

The contents of XR 03 register is placed on to DO BUS IN 207 when the XR 03 register address decode output line 430 is active and when the ST GATE commmand is inactive (high level) or when the +HARD STOP line becomes active.

The error reporting procedure to the control unit, will now be disclosed.

Figure 5:
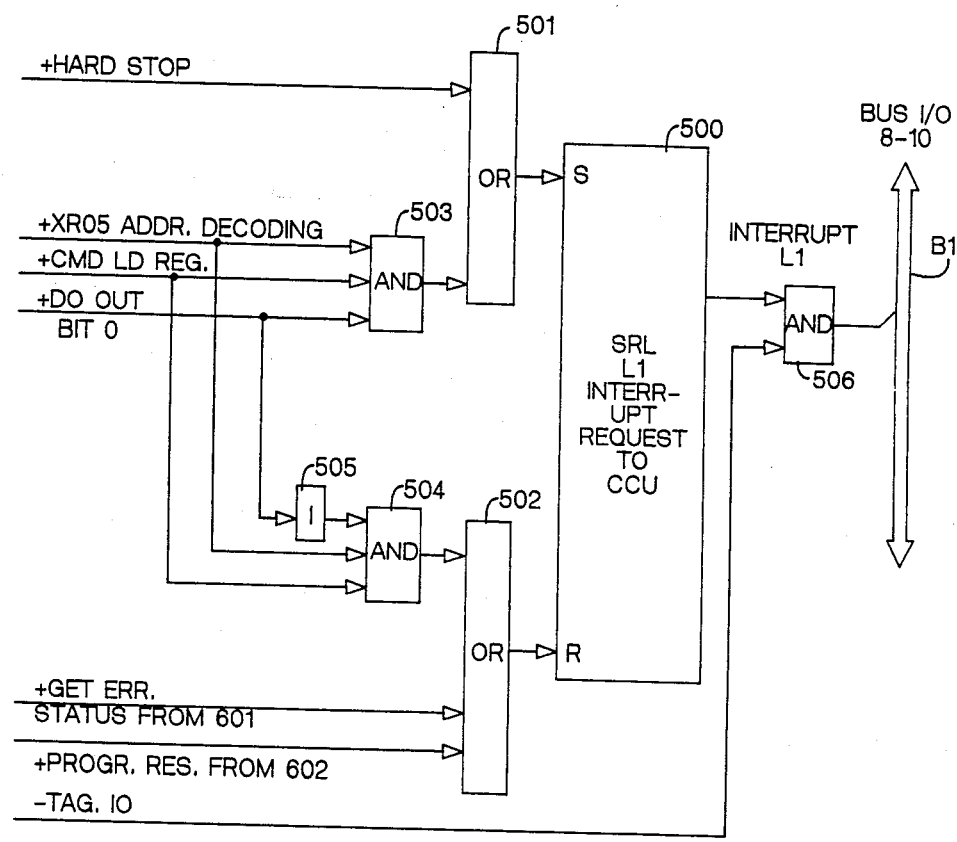
FIG. 5, shows the latch with which it is possible to apply the level 1 interrupt request on to I/O bus.

The active +HARD STOP line causes automatically a central control unit interrupt request by a circuit which will be diclosed further on, in reference to FIG. 5.

Level 1 interrupt: L1 is placed on to bus I/O 8-10 the same way as when such an interrupt is requested by the microcode (FIG. 5).

Upon reception of such an interrupt request, the control program in the central control unit, after determining which adapter had requested an interruption, initiates a GET ERROR STATUS PIO read operation as if the interrupt were required by the microcode.

Such an operation is run as follows: When tag TA is active, the information sent by CCU unit on to bus IO-8, has the following configuration.

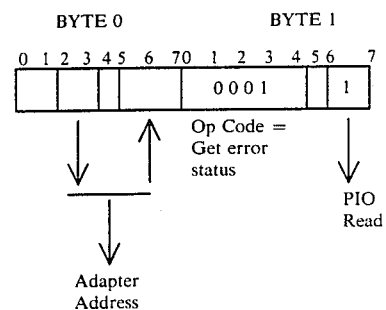

Figure 6:
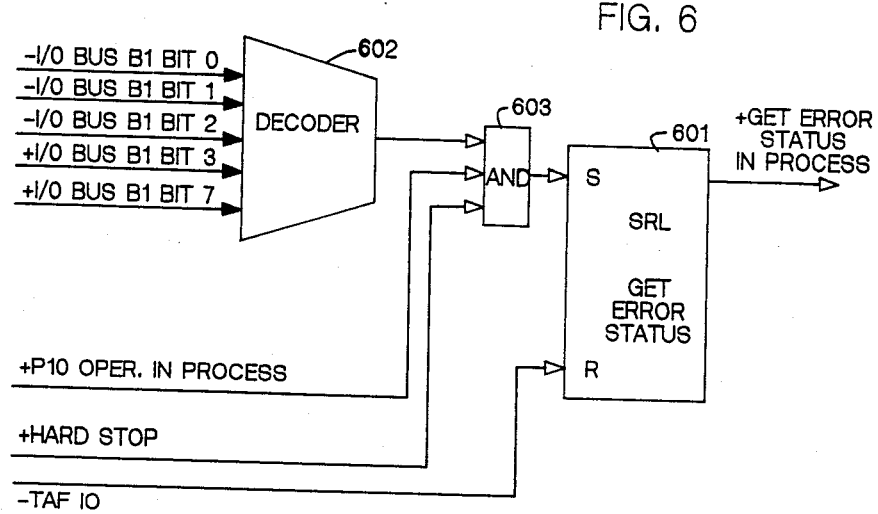
FIG. 6, shows the "GET ERROR STATUS" and "PROGRAM RESET" operation decode latches.
Figure 6:
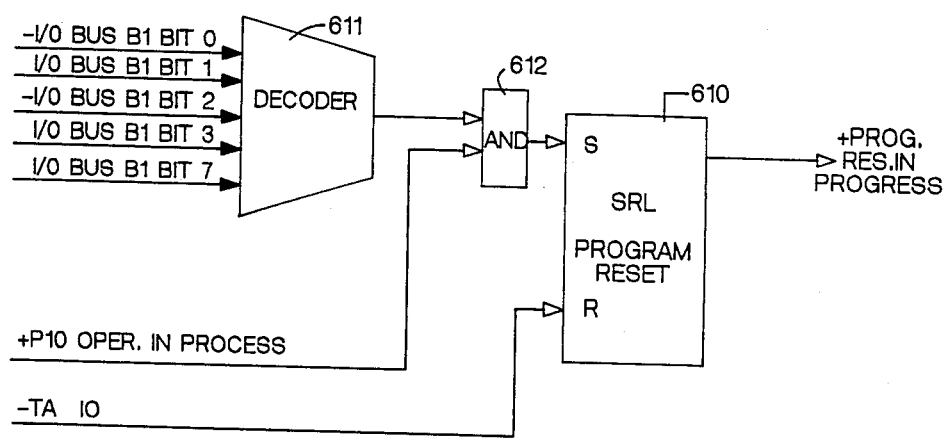

The interface logic 220 recognizes the adapter address and, since the +HARD STOP line is active, sets "GET ERROR STATUS" decode latch (FIG. 6). Such a condition resets L1 interrupt request to CCU latch (FIG. 5).

Interface 220 sends tag VH to unit CCU and waits for tag TD.

Figure 7:
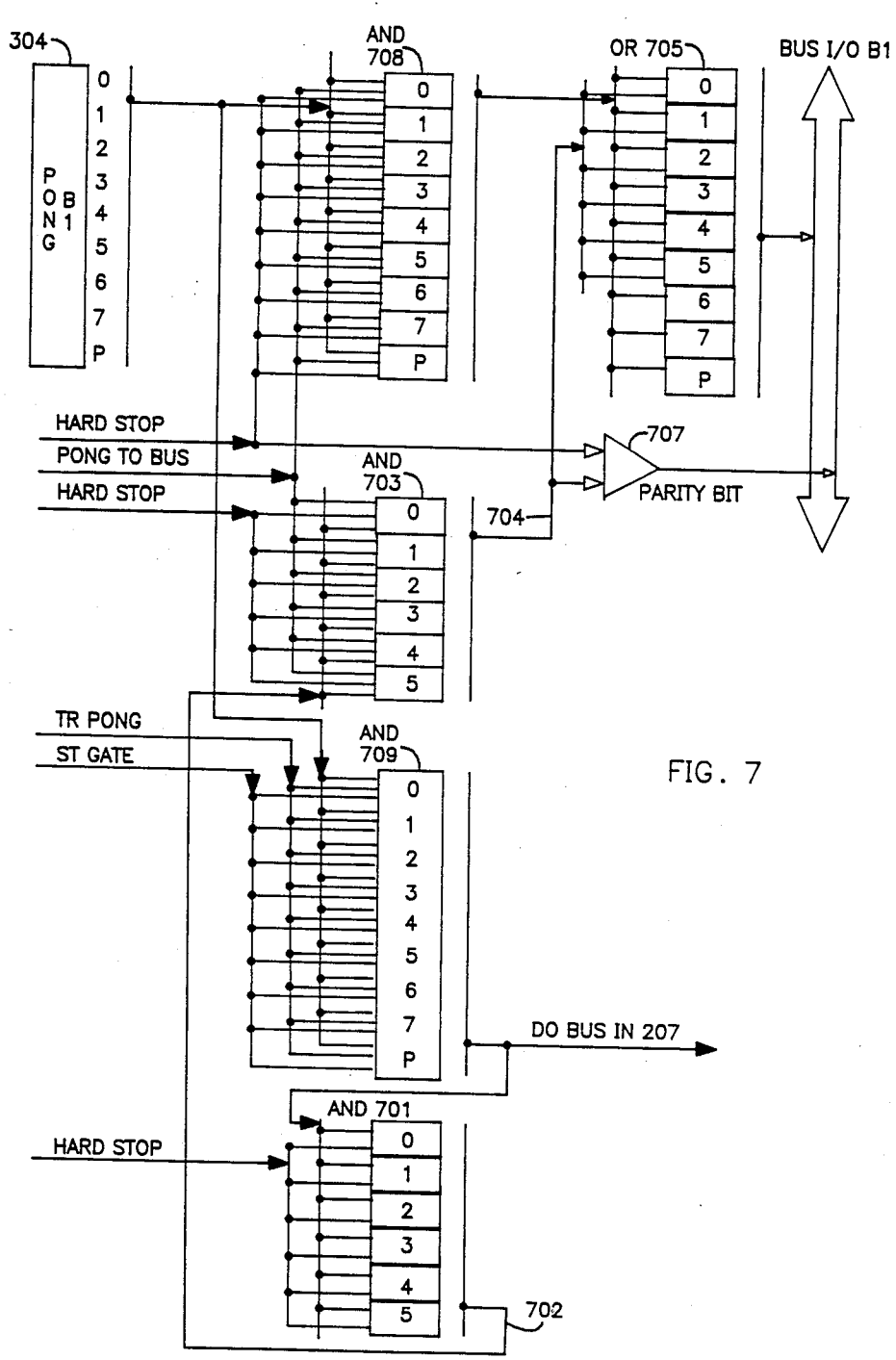
FIG. 7, shows the error condition transfer circuits from I/O bus.
Figure 8:
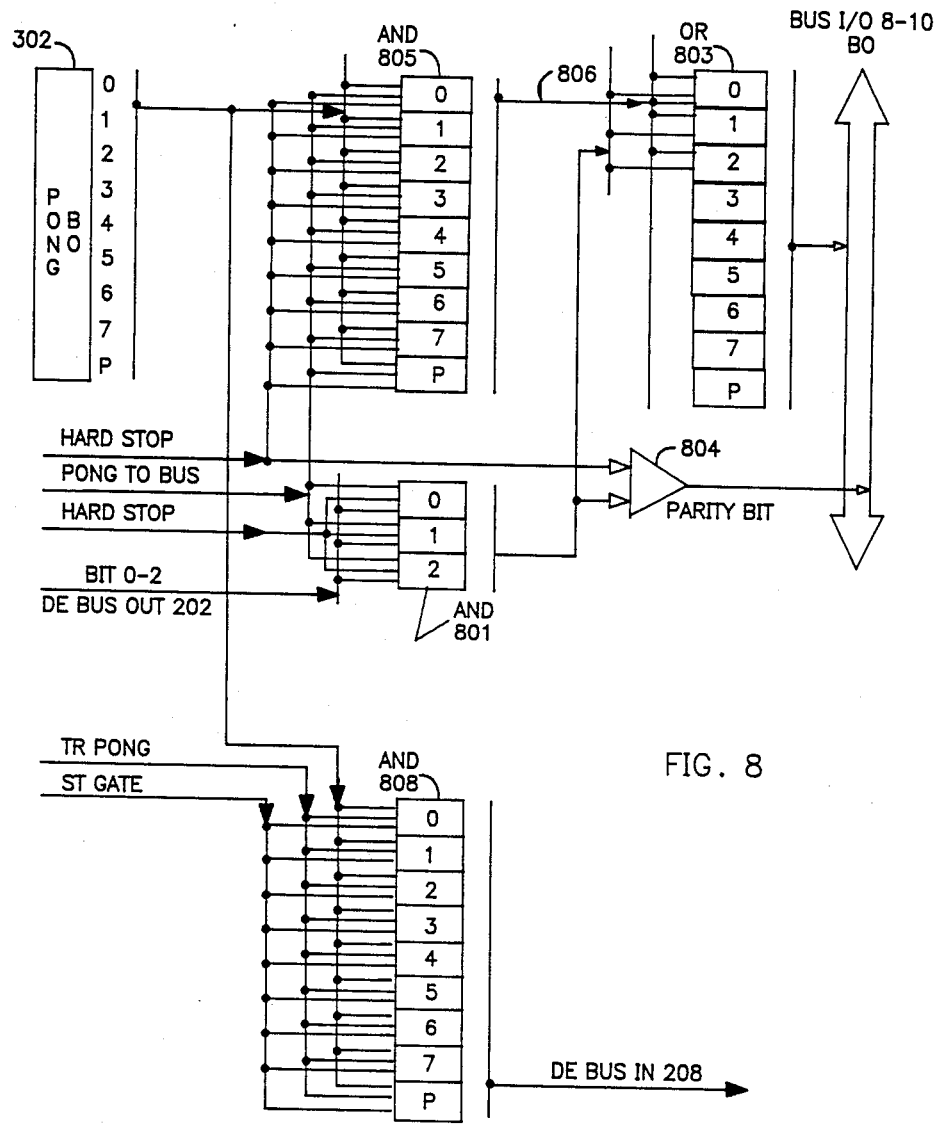
FIG. 8, shows the internal error condition register transfer circuits to I/O bus.

When tag TD is being active:
the contents of DO BUS IN on to which the bits of the error XR 03 register had been placed, and
the contents of DE BUS OUT on to which the bits of the error register 420 had been placed,
are transferred to the central processing unit by bus I/O 8, through interface circuits 220, described in FIGS. 7 and 8.

These bits are placed on to bus I/O −8, with the following configuration:

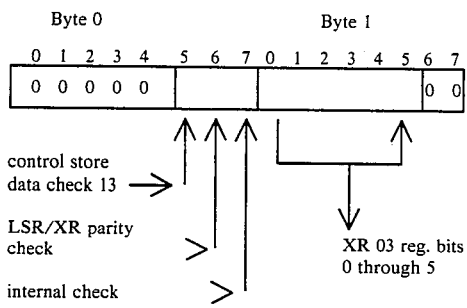

Transferring the contents of register PONG on to data bus IO-8, which normally occurs at tag TD time in normal PIO read operation, is inhibited by the HARD STOP condition.

Interface 220 then, sends, tag VH to the central control unit, write PIO operation ends normally.

The hard stop condition is reset, such as follows:

At the end of the operation, the control program of the central control unit can determine whether the adapter is in hard stop mode since one of the bits 0 through 5 of the data byte B1, is active.

In order to reactivate the adapter operation, the control program sends a "program reset" command.

Such a command is sent through a PIO write operation to bus I/O 8, with the following configuration:

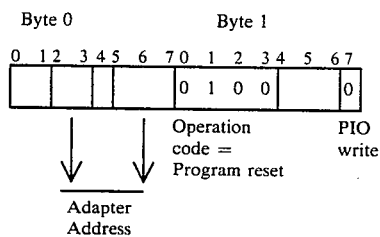

Logic 220 recognizes the adapter address and decodes the operation code and then sets the Program Reset Decode Latch (FIG. 6).

Decoding the Program Reset Operation code is always active since the Program Reset command can be sent by the CCU control program even when the adapter is not in Hard Stop mode.

The interface logic sends tag VH to the central control unit and waits for tag TD.

At TD tag time, the central control unit places the data half-word (byte B0, B1) on to bus IO-8. Such a data half-word may have any configuration since it is not used by the adapter.

The interface sends tag VH, and the PIO write operation ends normally. The program reset decode latch, set at the beginning of the PIO operation, remains active until the operation is completed; it is reset by inactive tag IO (FIG. 6).

Where the program reset decode latch is active, it operates as follows:
- it sets the latch in stage 3 of register XR 04 proving the signal DES HARD STOP,
- activates the reset line of microprocessor 444.

Besides the microprocessor error register bits, all the other registers (external registers, local store registers, control store data) are not modified by the program reset command.

When the program reset decode latch becomes inactive, at the end of the corresponding PIO operation:
the programmed reset latch (XR 04, bit 1) remains active, the hard stop disable latch (XR 04 bit 3) remains active which removes the hard stop condition, by means of AND circuit 408.

The microprocessor reset line becomes inactive which causes the microprocessor to restart processing at Interrupt level 0, Address 0, like after a general Reset.

Then, the microprocessor restarts controlling the adapter.

The instruction at level 0 address 0, is a Branch On Bit BOB instruction which tests whether the XR 04 bit 0 general reset latch, is active.

As in the present case such a latch is inactive, a second BOB instruction is carried out; it tests whether the XR 04 bit 1 Program Reset latch, is active.

As this latch is active, the third instruction reads the XR 03 Error Register into a local store register.

The fourth instruction clears XR 03 register.

The fifth instruction resets the Hard Stop Disable latch (XR 04, bit 3) in order to allow the Hard Stop Mechanism to operate again if a new error occurs.

The microprocessor transfers all the external registers to the local store and finally transfers the local store register contents to the control store.

The microprocessor, then, enters a wait status (loops in level zero). Waiting for a DUMP command sent by the control unit through a PIO write operation.

Upon reception of such a command, the microprocessor transfers the contents of its control store to the CCU unit, through bus I/O-8.

II. PROCESSING OF ERRORS CONDITIONS WHICH CAN BE HANDLED BY THE MICROCODE

When error conditions can be handled by the microcode, i.e., the errors are indicated by bits 6 and 7 of register XR 03, and the error reporting procedure is as follows:

This type of error does not affect the microcode integrity. The microcode includes error recovery procedures so as to report such a type of error to the central control unit.

When one of these error conditions is checked by detector 400, it is stored in XR 03 register bit 6 or 7. OR circuit 402 which receives the two bits, generates an interrupt request, level 0, on its output; IRPT LEV O which is sent to logic 217.

Such a request is sent to the microprocessor.

When the microcode enters the level 0 the operations are as follows:

XR 03 register is read (external register read operation).

An interrupt request, level 1, is applied to the central control unit, setting bit 0 of the XR 05 interrupt register, to "1".

The interrupt request is placed on to bus IO-8, through the interface 220 logic (FIG. 5).

XR 03 register is cleared (external register write operation).

The interrupt request, level 0, in logic 217, is removed.

The microcode returns then to the previous interrupt level where it was before the error occurs. The error recovery procedures are run and the normal processing is started anew.

The central control unit answers the interrupt request, level 1. After the central control unit has determined which adapter has required interrupt L1, it sends a "GET ERROR STATUS" PIO read operation.

At tag TA time, the information sent on to bus IO-8 has the following format:

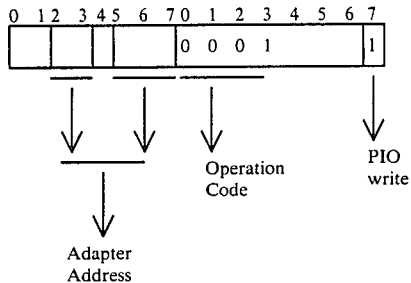

At tag TD time, the information sent by the adapter on to bus I/O-8 has the following format:

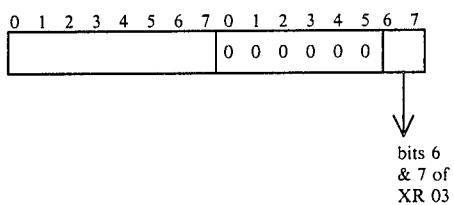

Interface 220 recognizes the adapter address at tag TA time, makes an interrupt request, level 1 to the microprocessor, and stores the contents of BUS I/O-8 into register PING.

When the microcode enters the level 1, it reads register PING, recognizes the GET ERROR STATUS operation and loads the error bits (XR 03 bits 6 and 7) into register PONG.

This register contents is placed on to bus I/O-8 at tag TD time so as to be transferred to the central control unit.

The microcode resets the L1 interrupt request to CCU latch by resetting register XR 05 bit 0, and resumes its normal processing (FIG. 5).

The description has been made assuming that the adapters were under the control of the central control unit upon occurrence of the error conditions. It is obvious that, when the adapters are under the control of the maintenance system, the same procedure occurs but the commands are sent by the maintenance system instead of the central control unit, and the data errors on bus I/O 8 are sent to this system.

The circuits of interface 220 used for the implementation of this invention will now be described.

FIG. 5 illustrates the L1 interrupt request to CCU latch, SRL 500 in the interface circuit 220. It can be set by a signal on its input S and reset by a signal on its input R.

Such a latch is set when the hard stop error condition is detected, i.e., when the HARD STOP signal which is applied to OR gate 501, is "1".

The latch resetting conditions are applied by OR gate 502. In Hard Stop mode, one of the resetting conditions is a "GET ERROR STATUS" operation in process which is supplied by the "GET ERROR STATUS" decode latch (FIG. 6). Such a latch 500 can also be reset by the "PROGRAM RESET" operation in process.

In normal operation mode, such a latch 500 is set when the adapter makes an interrupt request, level 1, to the CCU.

Such a condition is indicated by register XR 05 bit 0 the contents of which is sent on to DO BUS OUT 203.

Therefore, the latch is set when the following conditions namely, XR 05 ADDR. DECODING, COMMAND LD REG, DO OUT BIT 0 set to "1", causing AND gate 503 to provide a set condition to latch 500 through OR gate 501.

The latch is reset when the following conditions, namely, XRO5 ADDR DECODING, COMMANDE LD REG, DO OUT BIT 0 set to "0", are present, causing AND gate 504 to provide the reset condition through OR gate 502.

Inverter 505 receives DO OUT BIT 0 to provide this bit inverted to AND gate 504.

The interrupt request L1 at the latch output is placed on to bus I/O 8-10 through AND gate 506 when tag IO is de-activated, i.e., when an input/output operation is ended and the adapters can place anew the interruptions on to the bus.

FIG. 6 illustrates the "GET ERROR STATUS" 601 and the "PROGRAM RESET" 610 decode latches in interface 220.

Decoder 602 receives the bits 0, 1, 2, 3 and 7 of byte B1 on bus I/O 8 which are indicative of the operation code and of the type of operation, and recognizes the "GET ERROR STATUS" operation code.

AND gate 603 has one of its three inputs connected to the output of decoder 602. The other two inputs receive the PIO operation in process and the hard stop signals, respectively.

The output of gate 603 is applied to the set input S of latch 601 which supplies the "GET ERROR STATUS" operation in process, at its output. The latch is reset at the end of the PIO operation when tag IO becomes inactive.

Decoder 611 receives bits 0, 1, 2, 3 and 7 of byte B1 which are indicative of the operation code and of the type of operation, and recognizes the "PROGRAM RESET" operation code.

AND gate 612 has a first input connected to the output of decoder 611 and a second input which receives the PIO operation in process signal. The output of AND gate 612 is connected to the set input S of "PROGRAM RESET" latch 610. Such a latch is reset when tag IO becomes inactive.

FIG. 7 illustrates the interface circuits 220 used to transfer the DO BUS IN contents on to bus I/O 8-10 when the microprocessor is failing. As a rule, the data exchanges between the input and output buses of the microprocessor are carried out through PING and PONG registers, such as disclosed in reference to FIG. 3.

When the hard stop error condition occurs, XR03 register contents is placed on to DO BUS IN 207, such as disclosed in reference to FIG. 4.

Bits 0 through 5 on this bus are applied to the inputs of a series of AND gates 701. Each of the gates in the series receives one of the bits 0 through 5, on one of its inputs. The other input thereof receives +HARD STOP signal from the output of AND circuit 406 (FIG. 4).

Consequently, when this signal is "1", i.e., when the hard stop error condition has been detected by circuit 224, bits 0 through 5 of XR03 register are transferred on to the output bus 702 of the gate series 701.

Another series of six AND gates 703 is used to transfer the XR03 bits 0 through 5 on to the output bus 704. Each AND gate receives one of the bits on bus 702 on a first input thereof. A second input thereof receives +HARD STOP signal, and a third input thereof receives the PONG to BUS signal generated by the interface control logic. Bits 0 through 5, therefore, are transferred on to the output bus 704 when the PING to BUS signal is active and when the hard stop error condition has been detected without using register PONG.

Bits 0 through 5 on bus 704 are place on to bus I/O byte B1 through a series of OR circuits 705. The parity bit corresponding to these six bits, is generated by a parity bit generating circuit 707 which is inhibited when the hard stop error condition does not exist any longer.

In normal operation mode, the contents of register PONG B1 304 can be placed on to bus I/O byte B1 through the assembly of AND gates 708. Each of these gates receives a bit from register PONG 1, HARD STOP signal and PONG to BUS signal. Therefore, when the hard stop error condition does not exist, the HARD STOP signal is "1" and the register PONG B1 contents is transferred on to bus I/O through AND gates 708 and OR gates 705.

The contents of register PONG B1 304 is placed on to the DO BUS IN 207 by the assembly of AND gates 709. Each of these gates receives a bit from register PONG B1, TR PONG signal and ST GATE signal in order to transfer the contents of register PONG on to bus 207.

FIG. 8 illustrates the interface circuits 220 used to transfer the contents of DE BUS OUT 202 on to which the error register bits are placed when the hard stop error condition occurs to bus I/O 8.

Each of the bits 0 through 2 of the DE BUS OUT 202 is applied to one input of the series of AND gates 801 which are used to transfer those bits on the output bus 802 when the +HARD STOP signal is "1" (hard stop error condition), and when signal +PONG to BUS, is active.

Bits 0 through 2 on bus 802 are applied to three OR gates 803, so that they can be transferred on to BUS I/O BYTE BO. The parity of these four bits is generated by the parity bit generating circuit 804 which is inhibited when there is no hard stop error condition.

In normal operation, the contents of register PONG BO 302 is transferred to bus I/O byte BO through the assembly of AND gates 805 and the assembly of OR circuits 803. Each AND gate of assembly 805 receives one of the bits of register PONG BO, the HARD STOP signal which is "1" when there is no error condition, and PONG to BUS signal. Each OR gate of the assembly 803 receives one of the bits on out bus 806 of the assembly of AND gates 805 in order to transfer these bits on to bus I/O byte BO.

The contents of register PONG BO is transferred on to DE BUS IN 208 through the assembly of the AND gates 808. Each gate receives one of the bits of register PONG BO and the TR PONG and ST PONG signals in order to pass the contents of register PONG BO on to bus 208.

While the invention has been particularly shown and described with reference to a preferred embodiment thereof, it will be understood by those skilled in the art that various changes in form and details may be made therein without departing from the spirit and scope of the invention.

We claim:

1. In data processing equipment having adapter means, a device located in each adapter for reporting error conditions occurring in the adapters (10), to the central control unit of said adapters (10) being of the type including a microcode controlled microprocessor (12) provided with input and output buses and having an internal error register (420) and error detection circuits (400, 226), characterized in that it comprises:
   storing means (XR03) for storing error conditions detected by the error detection circuits,
   error condition classification means (402 and 404) which receive error conditions from the storing means and give two indications: the first one being indicative that at least one error condition affecting the microcode integrity, has occurred, and the second one being indicative that at least one error condition not affecting the microcode integrity, has occurred,
   generation means (406, 408) for generating a HARD STOP signal responsible to the first indication so as to cause the microprocessor operation to be stopped,
   first transfer means (422, FIG. 7) for sending the error conditions to the central control unit when the hard stop signal is active,
   second transfer means (FIG. 8) for sending the contents of the internal error register (420) to the central control unit when the hard stop signal is active.

2. A device according to claim 1, characterized in that it includes:
   interrupt means (217) for interrupting the microprocessor at the highest priority level when the classification means give the second indication, and sending the error conditions which do not affect the microcode integrity, to the microprocessor-controlled central control unit.

3. A device according to claim 1 or claim 2 adapted for use in data processing equipment wherein the adapters are connected to the central control unit through a bus, each adapter including an interface (220) by means of which it is connected to the bus, the communication between the control unit being performed through input/output read and write operations, characterized in that it includes:
   interrupt request means (FIG. 5) for automatically sending an interrupt request when the hard stop signal is active, to the central control unit.

4. A device according to claim 3, characterized in that, upon reception of the interrupt request, the central control unit initiates a read operation so as to obtain the error conditions.

5. A device according to claim 4, characterized in that the first transfer means include:
   a first logic circuit (422, 424) which receives the contents of the storing means and transfers it over the input bus (207) to the microprocessor when the hard stop signal is active, and
   a second logic circuit (701, 703, 705) which receives the contents of said input bus to the microprocessor and places it over the input/output bus for its being sent to the control unit when the interface has recognized that the central unit has initiated a read operation for getting the error condition status.

6. A device according to claim 5, characterized in that the second transfer means include:
   means (412, 416, 418) for placing the contents of the microprocessor internal error register on to the output bus (202) of said microprocessor when the microprocessor operation is inhibited by the active hard stop signal, a third logic circuit (801, 803) for transferring the contents of said output bus when the interface has recognized that the central unit has initiated a read operation for obtaining the error condition status.

7. A device according to claim 6, characterized in that the central control unit, when it has received the error conditions, initiates a programmed reset write operation for resetting the adapter.

8. A device accoding to claim 7, characterized in that it includes:

means (FIG. 6, 444) for detecting that a programmed reset write operation has been initiated by the control unit and for starting the microprocessor into operation upon said detection, means (XR04, 408) for disabling the hard stop signal when the program reset write operation is ended, means (440) for resetting the storing means (XRO3) when the central control unit has received the error conditions.

* * * * *